United States Patent
Oga et al.

(10) Patent No.: US 8,543,239 B2
(45) Date of Patent: Sep. 24, 2013

(54) ROBOT CONTROL APPARATUS

(75) Inventors: Junichiro Oga, Kawasaki (JP); Junji Oaki, Kawasaki (JP); Hideki Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 196 days.

(21) Appl. No.: 12/597,954

(22) PCT Filed: Sep. 28, 2009

(86) PCT No.: PCT/JP2009/004949
§ 371 (c)(1),
(2), (4) Date: May 19, 2011

(87) PCT Pub. No.: WO2010/047043
PCT Pub. Date: Apr. 29, 2010

(65) Prior Publication Data
US 2011/0218673 A1  Sep. 8, 2011

(30) Foreign Application Priority Data
Oct. 21, 2008  (JP) .................................. 2008-271373

(51) Int. Cl.
G06F 7/00   (2006.01)
G05B 19/04  (2006.01)

(52) U.S. Cl.
USPC ............ 700/254; 700/245; 700/249; 700/255

(58) Field of Classification Search
USPC ................................. 700/245, 249, 254, 255
See application file for complete search history.

(56) References Cited

U.S. PATENT DOCUMENTS

| 4,504,771 A | 3/1985 | Inaba et al. |
| 2003/0014156 A1 | 1/2003 | Hashimoto et al. |
| 2003/0171847 A1 | 9/2003 | Cheng et al. |

FOREIGN PATENT DOCUMENTS

| JP | 63-305407 | 12/1988 |
| JP | 06-324730 | 11/1994 |
| JP | 07-104825 | 4/1995 |
| JP | 2001-100828 | 4/2001 |
| JP | 2001100828 A * | 4/2001 |
| JP | 2006-227724 | 8/2006 |

OTHER PUBLICATIONS

Japanese Office Action for Japanese Application No. 2008-271373 mailed on Sep. 4, 2012.
International Search Report for PCT/JP2009/004949 mailed on Dec. 30, 2009.
Written Opinion of the International Searching Authority for PCT/JP2009/004949 mailed on Dec. 30, 2009.
Deo, et al. Robot Subtask Performance with Singularity Robustness using Optimal Damped Least-Squares, Proceedings of the 1992 IEEE International Conference on Robotics and Automation, May 1992, pp. 434-441.

* cited by examiner

*Primary Examiner* — Khoi Tran
*Assistant Examiner* — Robert Nguyen
(74) *Attorney, Agent, or Firm* — Turocy & Watson, LLP

(57) ABSTRACT

A robot control apparatus includes: a joint angular velocity estimation unit (115) calculating a plurality of first joint angular accelerations in already executed control cycles by calculating a joint angular acceleration from a joint angle for each control cycle, and estimating a joint angular velocity in a still unexecuted control cycle from the first joint angular accelerations; a velocity determination unit (113) determining whether the estimated joint angular velocity exceeds a maximum velocity; and a suppression velocity calculation unit (114) calculating a suppression joint angular velocity in the still unexecuted control cycle from the estimated joint angular velocity.

4 Claims, 6 Drawing Sheets

US 8,543,239 B2

ROBOT CONTROL APPARATUS

TECHNICAL FIELD

The present invention relates to a robot control apparatus and a robot control method controlling so as to determine a target position of a robot arm or the like.

BACKGROUND ART

An interpolation operation of operating a control subject (hereinafter, referred to as a "tip end") such as an arm tip end portion of a robot so that the control subject can follow a trajectory such as a straight line, a circular arc and a curved line having a designated curvature is realized in the following manner. Specifically, a robot control apparatus is allowed to store position and posture data regarding an operation start position and final target position of the control subject, calculates, for each control cycle, a tip end position command value interpolated so that the trajectory to be followed can be a designated trajectory between the aforementioned two points, converts the tip end position command value into an angle (hereinafter, referred to as a "joint angle") of each joint axis to thereby define a joint angle command value, and further, controls an actuator of each shaft so that the joint angle can coincide with the joint angle command value.

In the case of a multi-joint robot, the tip end position command value cannot be sometimes converted into the joint angle command value, and a threshold point in this case is called a singular point. It is known that a certain joint angular velocity takes an extremely large value suddenly when the robot passes through the singular point or the vicinity of the singular point. However, in actual, an allowable maximum velocity is determined owing to restrictions of constituent components, and such control processing, that is, creation of the command value, that does not allow the joint angular velocity to exceed the maximum velocity, becomes necessary. Heretofore, the creation has been carried out by, after determining whether or not the joint angular velocity is located at the vicinity of the singular point, correcting the tip end position command value so that the joint angular velocity cannot exceed the allowable maximum value (refer to Patent Literature 1 (JP-A 2006-227724) and Patent Literature 2 (JP-A H6-324730)).

In Patent Literature 1, it is determined whether or not the joint angular velocity is located at the vicinity of the singular point based on a joint angle command value obtained by performing coordinate conversion, and in the case where the joint angular velocity is located at the vicinity concerned, another joint angle command value is created by separate processing. In Patent Literature 2, the joint angular velocity is calculated from the calculated joint angle command value, it is determined whether or not the joint angular velocity is located at the vicinity of the singular point based on an increment thereof, and a velocity of the position command value is corrected, whereby the velocity concerned is not allowed to exceed the maximum velocity.

However, in such a singular point vicinity determination method based on singular point area information of the joint angle, which is as described in Patent Literature 1, it is necessary to investigate all of the singular point areas in advance. Moreover, even if the joint angular velocity is located at the vicinity of the singular point, the robot does not exceed the maximum velocity if an operation velocity thereof at a control point is sufficiently small. However, it is necessary to use separate processing, and new processing that smoothly changes the velocity at the time of switching the processing becomes necessary.

Moreover, in the method as described in Patent Literature 2, it is necessary to preset a velocity threshold value, which serves as a determination criterion, at the maximum velocity in order to avoid an erroneous determination in a usual operation. Accordingly, it is possible that the robot may be operated at the vicinity of the maximum velocity though for a short time. Moreover, even if the velocity is suppressed, it is frequent that the robot has some acceleration immediately after the velocity is determined to be excessive, and accordingly, the robot cannot slow down immediately.

As described above, it has been difficult to stably operate the robot in the case where the robot passes through an area such as the vicinity of the singular point, where the joint angular velocity changes suddenly.

CITATION LIST

Patent Literature

PTL 1: JP-A 2006-227724
PTL 2: JP-A H6-324730

SUMMARY OF INVENTION

Technical Problem

An object of the present invention is to provide a robot control apparatus and a robot control method, which can operate a robot stably even when the robot passes through an area such as a vicinity of a singular point, where a joint angular velocity changes suddenly.

Solution to Problem

An aspect of the present invention inheres in a robot control apparatus controlling a robot having a joint, including: an actuator configured to drive the joint for each control cycle; a detection unit configured to detect a joint angle of the joint for the each control cycle; a position calculation unit configured to calculate a tip end position of the robot from the joint angle for the each control cycle; a first value calculation unit configured to calculate a position command value for controlling the tip end position for the each control cycle; an error calculation unit configured to calculate an error between the tip end position and the position command value for the each control cycle; a difference calculation unit configured to calculate a joint angle difference from the error by inverse kinematic calculation for the each control cycle; an second value calculation unit configured to calculate a joint angle command value by integrating the joint angle difference for the each control cycle; a drive unit configured to drive the actuator based on the joint angle command value for the each control cycle; a first velocity estimation unit configured to calculate a plurality of first joint angular accelerations in already executed control cycles by calculating the joint angular acceleration from the joint angle for the each control cycle, and configured to estimate a joint angular velocity in a still unexecuted control cycle from the first joint angular accelerations; a maximum velocity memory configured to store a maximum velocity for the estimated joint angular velocity; a velocity determination unit configured to determine whether the estimated joint angular velocity exceeds the maximum velocity; and a suppression velocity calculation unit configured to calculate a suppression joint angular velocity in the still unexecuted control cycle from the estimated joint angular velocity when the estimated joint angular velocity is determined to exceed the maximum velocity.

Another aspect of the present invention inheres in a robot control apparatus controlling a robot having a joint including: an actuator configured to drive the joint for each control cycle; a detection unit configured to detect a joint angle of the joint for the each control cycle; a position calculation unit configured to calculate a tip end position of the robot from the joint angle for the each control cycle; a first value calculation unit configured to calculate a position command value for controlling the tip end position for the each control cycle; an error calculation unit configured to calculate an error between the tip end position and the position command value for the each control cycle; a first difference calculation unit configured to calculate a first joint angle difference from the error by inverse kinematic calculation for the each control cycle; an second value calculation unit configured to calculate a joint angle command value by integrating the first joint angle difference for the each control cycle; a drive unit configured to drive the actuator based on the joint angle command value for the each control cycle; a first velocity estimation unit configured to calculate a second joint angle difference in a still unexecuted control cycle by calculating the joint angle difference from the position command value sequentially, and configured to estimate a joint angular velocity in a still unexecuted control cycle from the second joint angle difference; a maximum velocity memory configured to store a maximum velocity for the estimated joint angular velocity; a velocity determination unit configured to determine whether the estimated joint angular velocity exceeds the maximum velocity; and a suppression velocity calculation unit configured to calculate a suppression joint angular velocity in the still unexecuted control cycle from the estimated joint angular velocity when the estimated joint angular velocity is determined to exceed the maximum velocity.

Advantageous Effects of Invention

A robot control apparatus and a robot control method according to the present invention have the advantage that it is possible to operate a robot stably even when the robot passes through an area such as a vicinity of a singular point, where a joint angular velocity changes suddenly.

DESCRIPTION OF EMBODIMENTS

Figure 1:
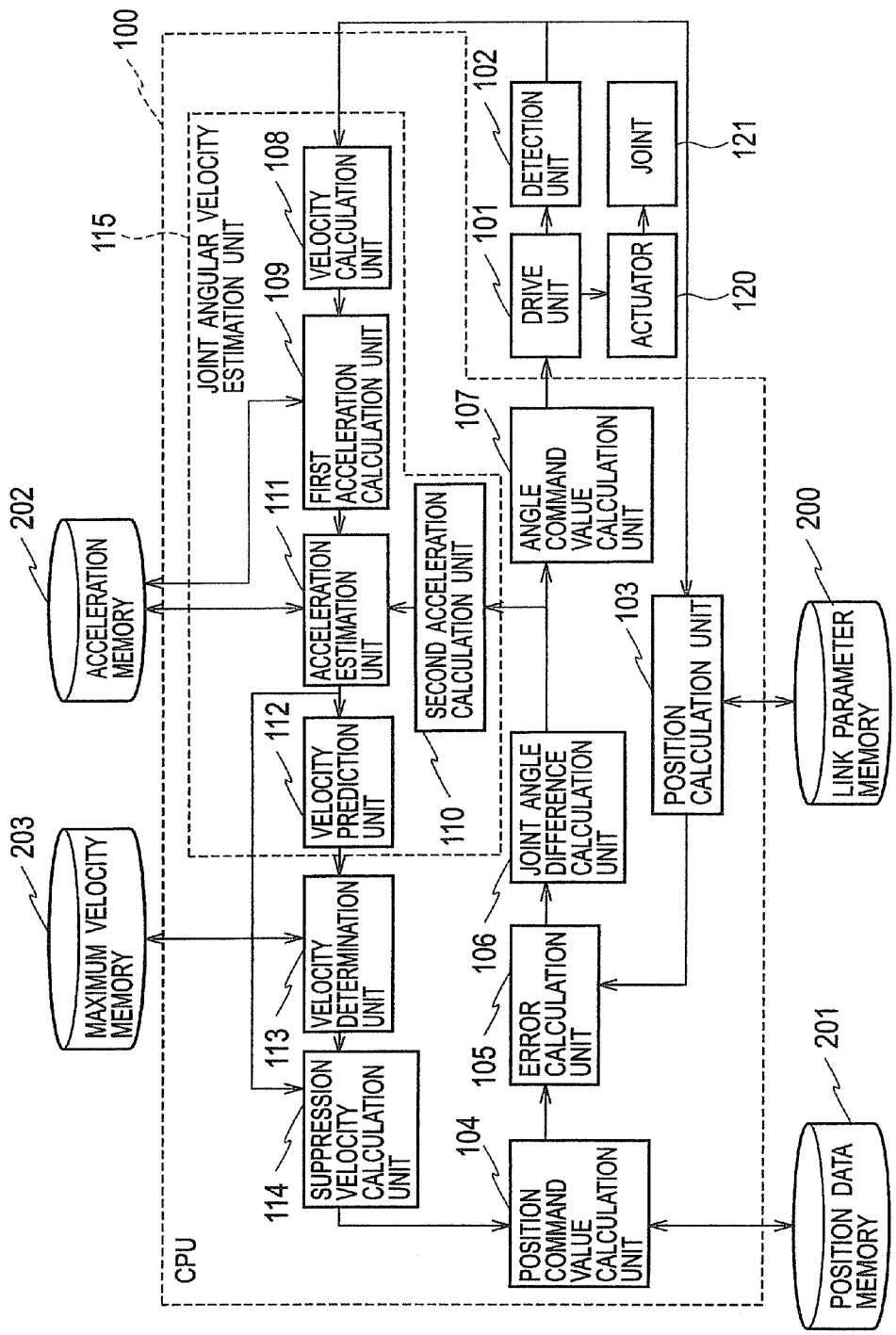
FIG. 1 is a block diagram showing an example of a robot control apparatus according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Example 1

First Embodiment

As shown in FIG. 1, a robot control apparatus according to a first embodiment of the present invention includes a central processing unit (CPU) 100, a drive unit (amplifier) 101, a detection unit 102, an actuator 120, a link parameter memory 200, a position data memory 201, an acceleration memory 202, and a maximum velocity memory 203.

The actuator 120 is attached to a joint 121, and controls the joint 121 for each control cycle. The joint 121 is one of joints of a robot having a plurality of the joints and a plurality of links.

The detection unit 102 is attached to the drive unit 101. The detection unit 102 includes a position detection sensor such as an encoder, a filter and the like. The detection unit 102 sequentially detects a joint angle of the joint 121 for each control cycle.

The CPU 100 logically includes a position calculation unit 103, a position command value calculation unit 104, an error calculation unit 105, a joint angle difference calculation unit 106, an angle command value calculation unit 107, a joint angular velocity estimation unit 115, a velocity determination unit 113 and a suppression velocity calculation unit 114 as modules (logic circuits) which are hardware resources.

For each control cycle, the position calculation unit 103 sequentially calculates a tip end position of the robot in an orthogonal coordinate system by forward kinematic calculation from the joint angle detected by the detection unit 102 and from a link parameter stored in the link parameter memory 200.

For each control cycle, the position command value calculation unit 104 sequentially calculates a tip end position command value, which is interpolated so that the tip end position of the robot can move from an operation start position thereof to a final target position thereof, from target tip end position data stored in the position data memory 201.

For each control cycle, the error calculation unit 105 sequentially calculates an error between the tip end position of the robot, which is calculated by the position calculation unit 103, and the tip end position command value calculated by the position command value calculation unit 104.

For each control cycle, the joint angle difference calculation unit 106 sequentially calculates a joint angle difference

[Math. 1]

$$\Delta\theta$$

from the error, which is calculated by the error calculation unit 105, by inverse kinematic calculation using the Jacobian matrix. Here, for the error
[Math. 2]

$$\Delta x$$

and the joint angle difference
[Math. 3]

$$\Delta \theta$$

, Expression (1) is established, where J is the Jacobian matrix.
[Math. 4]

$$\Delta x = J \Delta \theta \qquad (1)$$

Hence, an inverse matrix $J^{-1}$ of the Jacobian matrix J is obtained, and the inverse matrix $J^{-1}$ is multiplied by the error
[Math. 5]

$$\Delta x$$

as in Expression (2), whereby the joint angle difference
[Math. 6]

$$\Delta \theta$$

is calculated.
[Math. 7]

$$\Delta \theta = J^{-1} \Delta x \qquad (2)$$

For each control cycle, the angle command value calculation unit 107 sequentially calculates the joint angle command value by integrating the joint angle difference calculated by the joint angle difference calculation unit 106.

For each control cycle, the drive unit 101 sequentially drives the actuator 120 by defining, as a control target value, the joint angle command value calculated by the angle command value calculation unit 107.

The joint angular velocity estimation unit 115 includes a velocity calculation unit 108, a first acceleration calculation unit 109, a second acceleration calculation unit 110, an acceleration estimation unit 111, and a velocity estimation unit 112.

The velocity calculation unit 108 takes a time difference between the joint angles detected by the detection unit 102, and sequentially calculates the joint angular velocity for each control cycle.

The first acceleration calculation unit 109 takes a time difference between the joint angular velocities calculated by the velocity calculation unit 108, and sequentially calculates a joint angular acceleration for each control cycle, thereby calculates the joint angular accelerations in a plurality of the already executed control cycles. The joint angular accelerations in the plurality of already executed control cycles are sequentially stored in the acceleration memory 202.

The second acceleration calculation unit 110 takes a time difference equivalent to the joint angle difference calculated by the joint angle difference calculation unit 106, and calculates a joint angular acceleration in a current control cycle.

Figure 2:
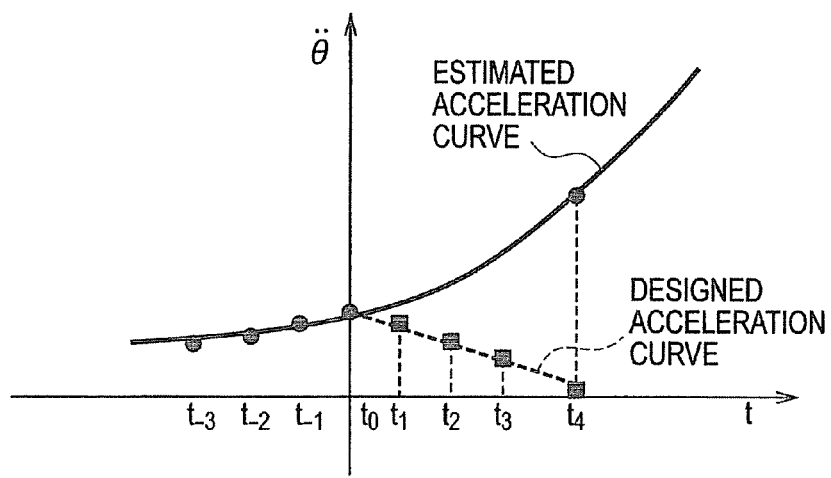
FIG. 2 is a graph for explaining of a acceleration estimation processing according to the first embodiment.

As shown in FIG. 2, the acceleration estimation unit 111 estimates joint angular accelerations
[Math. 8]

$$\ddot{\theta}$$

in a plurality of still unexecuted control cycles $t_1$, $t_2$, $t_3$ and $t_4$ by using an interpolation formula from the joint angular accelerations
[Math. 9]

$$\ddot{\theta}$$

in the plurality of already executed control cycles $t_{-1}$, $t_{-2}$ and $t_{-3}$, which are stored in the acceleration memory 202, and from the joint angular acceleration
[Math. 10]

$$\ddot{\theta}$$

in the current control cycle $t_0$, which is calculated by the second acceleration calculation unit 110. For example, an interpolation formula as a quadratic polynomial like Expression (3) is derived from a least-squares method:
[Math. 11]

$$\ddot{\theta}[t] = a_0 + a_1 t + a_2 t^2 \qquad (3)$$

where $a_0$, $a_1$ and $a_2$ are coefficients, and t is the control cycle. An estimated acceleration curve as shown by a solid line in FIG. 2 is drawn by the interpolation formula.

Figure 3:
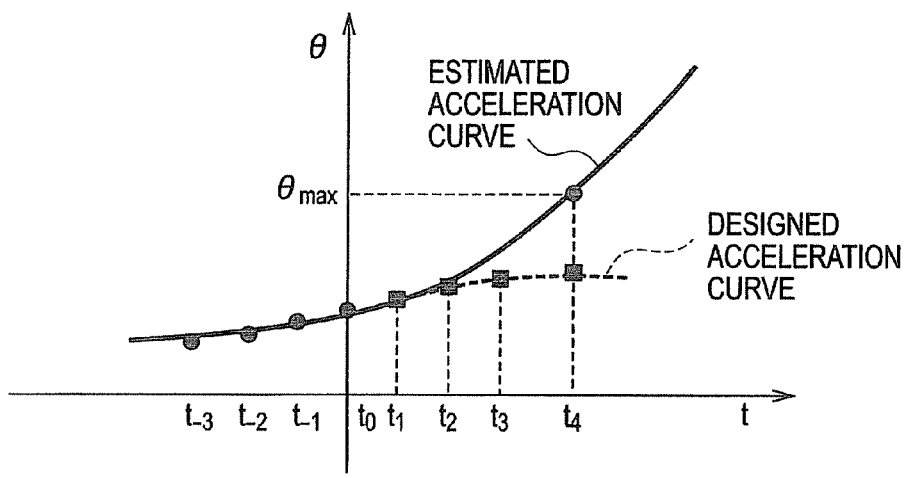
FIG. 3 is a graph for explaining a velocity estimation processing according to the first embodiment.

The velocity estimation unit 112 integrates the joint angular accelerations
[Math. 12]

$$\ddot{\theta}$$

in the plurality of still unexecuted control cycles $t_1$, $t_2$, $t_3$ and $t_4$, which are estimated by the acceleration estimation unit 111, and thereby individually estimates joint angular velocities
[Math. 13]

$$\dot{\theta}$$

in the plurality of still unexecuted control cycles $t_1$, $t_2$, $t_3$ and $t_4$ as shown by an estimated velocity curve (solid line) in FIG. 3.

The velocity determination unit 113 determines whether or not the joint angular velocities
[Math. 14]

$$\dot{\theta}$$

in the plurality of still unexecuted control cycles $t_1$, $t_2$, $t_3$ and $t_4$, which are estimated by the velocity estimation unit 112, exceed a maximum velocity (velocity threshold value)
[Math. 15]

$$\dot{\theta}_{max}$$

stored in the maximum velocity memory 203. The maximum velocity
[Math. 16]

$$\dot{\theta}_{max}$$

stored in the maximum velocity memory 203 is appropriately settable in accordance with types and the like of components composing the robot. For example, in FIG. 3, it is determined that the joint angular velocity
[Math. 17]

$$\dot{\theta}$$

in the still unexecuted control cycle $t_4$ exceeds the maximum velocity
[Math. 18]

$$\dot{\theta}_{max}$$

The suppression velocity calculation unit 114 calculates a suppression joint angular velocity
[Math. 19]

$$\dot{\theta}$$

for suppressing the joint angular velocity
[Math. 20]

$$\dot{\theta}$$

in the still unexecuted control cycle $t_4$, which is determined to exceed the maximum velocity
[Math. 21]

$$\dot{\theta}max,$$

to become the maximum velocity
[Math. 22]

$$\dot{\theta}max$$

or less as shown in Expression (4):
[Math. 23]

$$|\dot{\theta}| \leq |\dot{\theta}_{max}| \quad (4)$$

where, even if the joint angular velocity
[Math. 24]

$$\dot{\theta}$$

in the still unexecuted control cycle $t_4$ is the maximum velocity
[Math. 25]

$$\dot{\theta}max$$

or less, the joint angular velocity
[Math. 26]

$$\dot{\theta}$$

sometimes exceeds the maximum velocity
[Math. 27]

$$\ddot{\theta}max$$

on and after the still unexecuted control cycle $t_4$ in the case where the joint angular acceleration in the still unexecuted control cycle $t_4$ is somewhat large. Hence, a suppression joint angular acceleration
[Math. 28]

$$\ddot{\theta}$$

as shown by a designed acceleration curve (broken line) in FIG. 2 is set so that, in the still unexecuted control cycle $t_4$, the joint angular acceleration
[Math. 29]

$$\ddot{\theta}$$

can become 0 as in Expression (5), or that a sign thereof can be inverted from those in the control cycles up to the still unexecuted control cycle $t_3$ as in Expression (6):
[Math. 30]

$$|\ddot{\theta}|=0 \quad (5)$$

[Math. 31]

$$sgn(\ddot{\theta})=sgn(\ddot{\theta}(0)) \quad (6)$$

where the current control cycle (current time) is defined to be 0.

Moreover, the suppression velocity calculation unit 114 performs, for example, linear interpolation so that movement of the robot can smoothly make transition during a period from the current control cycle $t_0$ to the time $t_4$, and sets the suppression joint angular accelerations
[Math. 32]

$$\ddot{\theta}$$

in the plurality of still unexecuted control cycles $t_1$, $t_2$ and $t_3$, which are as shown by the designed acceleration curve (broken line) in FIG. 2. Furthermore, the suppression velocity calculation unit 114 integrates the set suppression joint angular accelerations
[Math. 33]

$$\ddot{\theta}$$

in the plurality of still unexecuted control cycles $t_1$, $t_2$, $t_3$ and $t_4$, and thereby calculates the suppression joint angular velocities
[Math. 34]

$$\dot{\theta}$$

in the plurality of still unexecuted control cycles $t_1$, $t_2$, $t_3$ and $t_4$ as shown by a designed velocity curve (broken line) in FIG. 3.

The position command value calculation unit 104 calculates the tip end position command values in the plurality of still unexecuted control cycles $t_1$, $t_2$, $t_3$ and $t_4$ based on the suppression joint angular velocities
[Math. 35]

$$\dot{\theta}$$

in the plurality of still unexecuted control cycles $t_1$, $t_2$, $t_3$ and $t_4$, which are calculated by the suppression velocity calculation unit 114.

The link parameter memory 200 stores the link parameters regarding the plurality of links of the robot, which are to be used at the time of calculating the tip end positions of the robot by the position calculation unit 103. The position data memory 201 stores the target tip end position data to be used at the time of calculating the tip end position command values by the position command value calculation unit 104. The acceleration storage device 202 sequentially stores the joint angular accelerations
[Math. 36]

$$\ddot{\theta}$$

in the plurality of already executed control cycles $t_1$, $t_2$ and $t_3$, which are calculated by the first acceleration calculation unit 109, and further stores the joint angular acceleration in the current control cycle, which is estimated by the acceleration estimation unit 111, and the like. The maximum velocity memory 203 prestores the maximum velocity
[Math. 38]

$$\dot{\theta}max$$

serving as the threshold value at the time of making the determination by the velocity determination unit 113.

A memory, a magnetic disk, an optical disk or the like may be used for the link parameter memory 200, the position data memory 201, the acceleration memory 202 and the maximum velocity memory 203. The memory or the like can serves as a program memory or the like storing a program executed by the CPU 100 (the details of the program are described later). The memory serves as a temporary data memory for storing data used in executing a program by the CPU 100, and used as a working domain.

Next, a description will be made of an example of a robot control method according to this embodiment of the present invention while referring to a flowchart of FIG. 4.

In step S101, control calculation is started. In step S102, for each control cycle, the position command value calculation unit 104 sequentially calculates the tip end position command value from a target tip end position data string stored in the position data memory 201. In step S103, for each control cycle, the position calculation unit 103 sequentially calculates the tip end position of the robot from the joint angle detected by the detection unit 102. For each control cycle, the error calculation unit 105 sequentially calculates the error between the tip end position calculated by the position calculation unit 103 and the tip end position command value calculated by the position command value calculation unit 104. In step S104, for each control cycle, the error calculation unit 106 sequentially calculates the joint angle difference by the inverse kinematic calculation using Expression (2).

Figure 5:
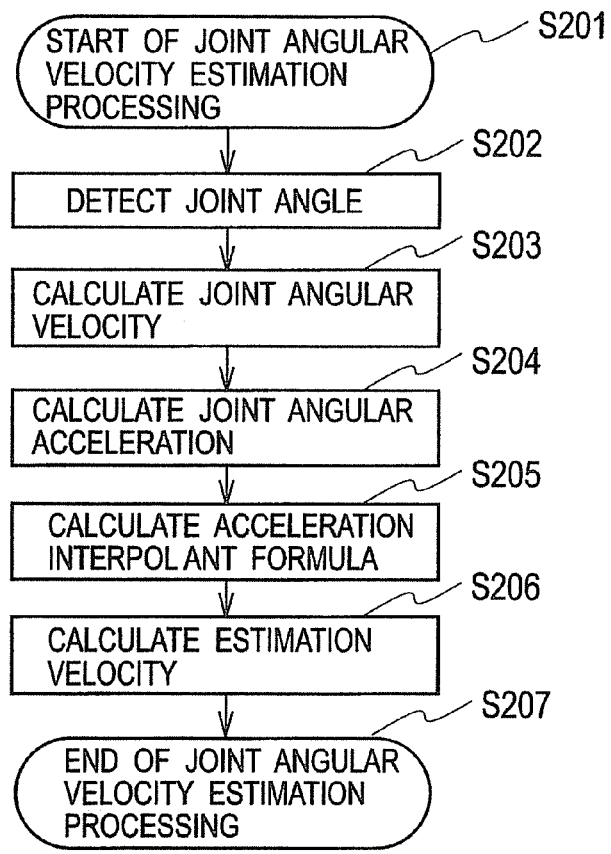
FIG. 5 is a flowchart for explaining a joint angular velocity estimation processing according to the first embodiment.

In step S105, joint angular acceleration estimation processing is performed by steps S201 to S207 in FIG. 5. In step S201, joint angular velocity estimation processing is started. In step S202, for each control cycle, the detection unit 102 sequentially detects the joint angle of the joint 121. In step S203, the velocity calculation unit 108 takes the time difference equivalent to the joint angle difference detected by the detection unit 102, and sequentially calculates the joint angular velocity for each control cycle. In step S204, the first acceleration calculation unit 109 takes the time difference between joint angular velocities calculated by the velocity calculation unit 108, and sequentially calculates the joint angular acceleration for each control cycle, thereby calculates the joint angular accelerations
[Math. 39]

$$\ddot{\theta}$$

in the plurality of already executed control cycles $t_{-1}$, $t_{-2}$ and $t_{-3}$ as shown in FIG. 2. The joint angular accelerations
[Math. 40]

$$\ddot{\theta}$$

in the plurality of already executed control cycles $t_{-1}$, $t_{-2}$ and $t_{-3}$ are sequentially stored in the acceleration memory 202. Moreover, the second acceleration calculation unit 110 takes the time difference equivalent to the joint angle difference calculated by the joint angle difference calculation unit 106, and calculates the joint angular acceleration in the current control cycle $t_0$. In step S205, the acceleration estimation unit 111 calculates the interpolation formula like Expression (3) by the least-squares method or the like from the joint angular accelerations
[Math. 41]

$$\ddot{\theta}$$

in the plurality of already executed control cycles $t_{-1}$, $t_{-2}$ and $t_{-3}$, which are stored in the acceleration memory 202, and from the joint angular acceleration
[Math. 42]

$$\ddot{\theta}$$

in the current control cycle $t_0$, which is calculated by the second acceleration calculation unit 110, and estimates the joint angular accelerations
[Math. 43]

$$\ddot{\theta}$$

in the plurality of still unexecuted control cycles $t_1$, $t_2$, $t_3$ and $t_4$ by using the interpolation formula. In step S206, the velocity estimation unit 112 integrates the joint angular accelerations
[Math. 44]

$$\ddot{\theta}$$

in the plurality of still unexecuted control cycles $t_1$, $t_2$, $t_3$ and $t_4$, which are estimated by the acceleration estimation unit 111, and thereby estimates the joint angular velocities
[Math. 45]

$$\dot{\theta}$$

in the plurality of control cycles $t_1$, $t_2$, $t_3$ and $t_4$ as shown in FIG. 3. In step S207, the processing is ended.

Figure 4:
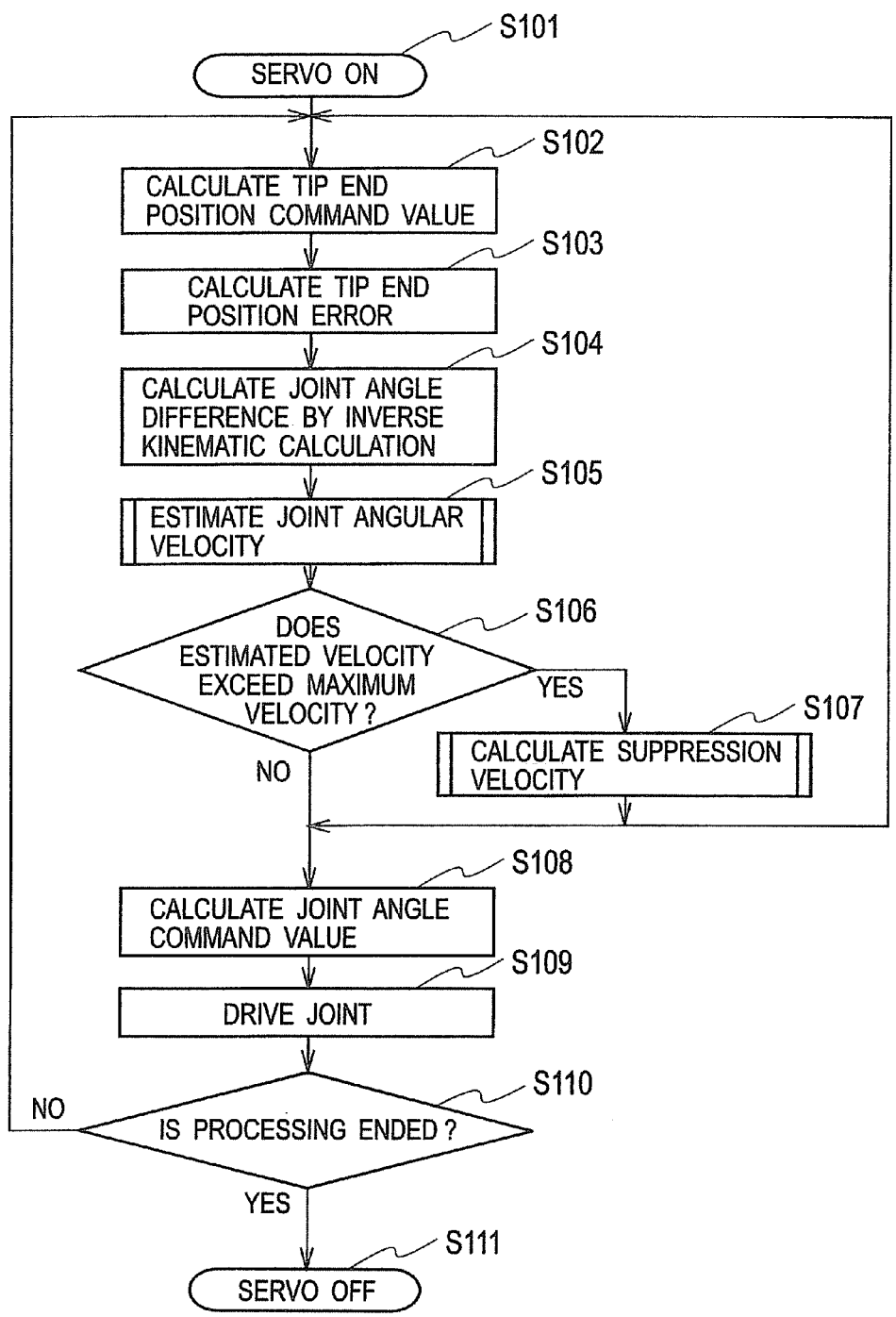
FIG. 4 is a flowchart for explaining an example of a robot control method according to the first embodiment.

In step S106 in FIG. 4, the velocity determination unit 113 determines whether or not the joint angular velocities
[Math. 46]

$$\dot{\theta}$$

in the plurality of still unexecuted control cycles $t_1$, $t_2$, $t_3$ and $t_4$, which are estimated by the velocity estimation unit 112, exceed the maximum velocity
[Math. 47]

$$\dot{\theta}\text{max}$$

stored in the maximum velocity memory 203. If at least any of the joint angular velocities
[Math. 48]

$$\dot{\theta}$$

in the plurality of still unexecuted control cycles $t_1$, $t_2$, $t_3$ and $t_4$ exceeds the maximum velocity
[Math. 49]

$$\dot{\theta}\text{max},$$

then the processing proceeds to step S107.

Figure 6:
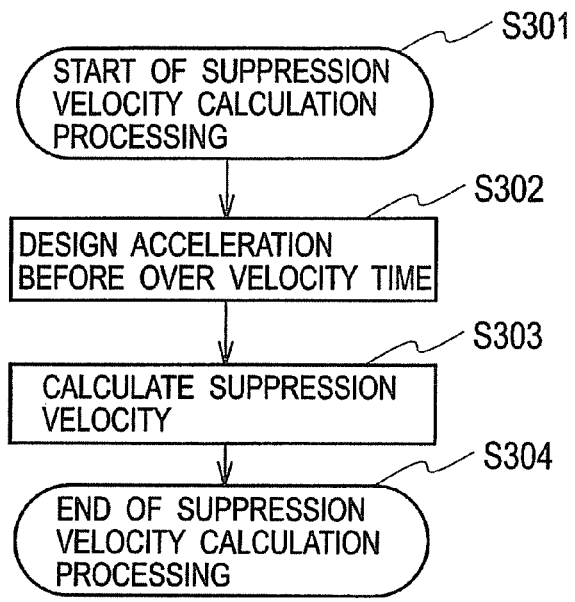
FIG. 6 is a flowchart for explaining a suppression joint angular velocity calculation processing according to the first embodiment.

In step S107, the suppression velocity calculation unit 114 performs suppression joint angular velocity calculation processing by steps S301 to S304 in FIG. 6. In step S301, the suppression joint angular velocity calculation processing is started, and in step S302, the suppression joint angular velocity
[Math. 50]

$$\dot{\theta}$$

for suppressing the joint angular velocity in the still unexecuted control cycle $t_4$, which is determined to exceed the maximum velocity
[Math. 52]

$$\dot{\theta}\text{max},$$

to become the maximum velocity
[Math. 53]

$$\dot{\theta}\text{max}$$

or less as in Expression (4) is calculated. Here, based on the joint angular acceleration
[Math. 54]

$$\ddot{\theta}$$

in the still unexecuted control cycle $t_4$, which is estimated by the acceleration estimation unit 111, the suppression joint angular acceleration
[Math. 55]

$$\ddot{\theta}$$

is set so that, in the control cycle $t_4$ in which the joint angular acceleration
[Math. 56]

$$\dot{\theta}$$

is determined to exceed the maximum velocity
[Math. 57]

$$\dot{\theta}\text{max}$$

, the joint angular acceleration
[Math. 58]

$$\ddot{\theta}$$

can become 0 as in Expression (5), or the sign thereof can be inverted from those in the control cycles up to the still unexecuted control cycle $t_3$ as in Expression (6). Moreover, the suppression joint angular accelerations
[Math. 59]

$$\ddot{\theta}$$

in the plurality of still unexecuted control cycles $t_1$, $t_2$ and $t_3$ are set, for example, by the linear interpolation so that the robot can smoothly make the transition during the period from the current control cycle $t_0$ to the time $t_4$. In step S303, the suppression velocity calculation unit 114 integrates the joint angular accelerations $$\ddot{\theta}$$

in the plurality of still unexecuted control cycles $t_1$, $t_2$, $t_3$ and $t_4$, and thereby calculates the suppression joint angular velocities $$\dot{\theta}$$

in the plurality of still unexecuted control cycles $t_1$, $t_2$, $t_3$ and $t_4$ as shown in FIG. 2. In step S304, the suppression joint angular velocity calculation processing is ended. Thereafter, the processing returns to step S102, and the position command value calculation unit 104 calculates the tip end position command values in the plurality of still unexecuted control cycles $t_1$, $t_2$, $t_3$ and $t_4$ based on the suppression joint angular velocities $$\dot{\theta}$$

In step S107, in the case where the joint angular velocities $$\dot{\theta}$$

in the plurality of still unexecuted control cycles $t_1$, $t_2$, $t_3$ and $t_4$ do not exceed the maximum velocity $$\dot{\theta}max$$

within a range estimated by the acceleration estimation unit 111, then in step S108, the position command value calculation unit 104 directly uses the joint angle command value calculated from the target tip end position data string stored in the position data memory 201, and in step S109, drives the joint by defining the joint angle command value as the control target value. If the control calculation is determined to be ended in step S110, then the processing is completed in step S111. Meanwhile, if the control calculation is determined not to be ended, then the tip end position command value is calculated again in step S103.

In accordance with the first embodiment of the present invention, from the joint angle of the actuator 120, the joint angular accelerations $$\ddot{\theta}$$

in the plurality of already executed control cycles $t_1$, $t_2$ and $t_3$ are calculated, the joint angular velocities $$\dot{\theta}$$

in the plurality of still unexecuted control cycles $t_1$, $t_2$, $t_3$ and $t_4$ are estimated, and the suppression joint angular velocity $$\dot{\theta}$$

is calculated, whereby the robot can be operated so that the joint angular velocity cannot exceed the maximum velocity $$\dot{\theta}max$$

in the plurality of still unexecuted control cycles $t_1$, $t_2$, $t_3$ and $t_4$. Hence, the robot can be operated stably even in such an operation that the robot passes through an area like the vicinity of the singular point, where the joint angular velocity $$\dot{\theta}$$

changes suddenly.

Moreover, the suppression joint angular velocities $$\dot{\theta}$$

in the plurality of still unexecuted control cycles $t_1$, $t_2$, $t_3$ and $t_4$ are calculated from the estimated joint angular velocities $$\dot{\theta}$$

in the plurality of still unexecuted control cycles $t_1$, $t_2$, $t_3$ and $t_4$ by the linear interpolation or the like, whereby the robot can be operated while smoothly making velocity transition before and after the vicinity of the singular point.

Note that, the series of procedures shown in FIGS. 4, 5, 6 and 8 can be achieved by controlling the robot control apparatus shown in FIG. 1 by means of a program having an algorism equivalent to that of FIGS. 4, 5, 6 and 8. For example, the procedures include: a step of detecting a joint angle of the joint 121 for each control cycle by detection unit 102; a step of calculating a tip end position of the robot from the joint angle for each control cycle; a step of calculating a tip end position command value for controlling the tip end position for each control cycle; a step of calculating an error between the tip end position and the tip end position command value for each control cycle; a step of calculating a joint angle difference from the error by inverse kinematic calculation for each control cycle; a step of calculating a joint angle command value by integrating the joint angle difference for each control cycle; a step of driving the actuator 120 based on joint angle command value for each control cycle; a step of calculating a plurality of joint angular accelerations in already executed control cycles by calculating the joint angular acceleration from the joint angle for each control cycle, and then estimating a joint angular velocities in a still unexecuted control cycles from the plurality of the joint angular accelerations in the already executed control cycles; a step of determining whether the joint angular velocities in the still unexecuted control cycle exceeds a maximum velocity stored in the maximum velocity memory; a step of calculating suppression joint angular velocities in the still unexecuted control cycles from joint angular velocities in the still unexecuted control cycles respectively when it is determined that the joint angular velocities in the still unexecuted control cycles to maximum velocity; and the like.

The program may be stored in, for example, the position data memory 201 or the like. The procedures of the method according to the embodiment of the present invention can be performed by storing the program in a computer-readable storage medium and reading the program from the computer-readable storage medium to the position data memory 201 or the like. Furthermore, it is possible to store a program in the position data memory 201 or the like via an information processing network, such as the Internet.

Example 2

Second Embodiment

In the first embodiment of the present invention, the description has been made of the case of estimating the joint angular velocities in the plurality of still unexecuted control cycles by calculating the joint angular velocities and the joint angular accelerations from the joint angle of the actuator 120. In a second embodiment of the present invention, a description will be made of the case of estimating the joint angular velocities in the plurality of still unexecuted control cycles from the tip end position command values.

Figure 7:
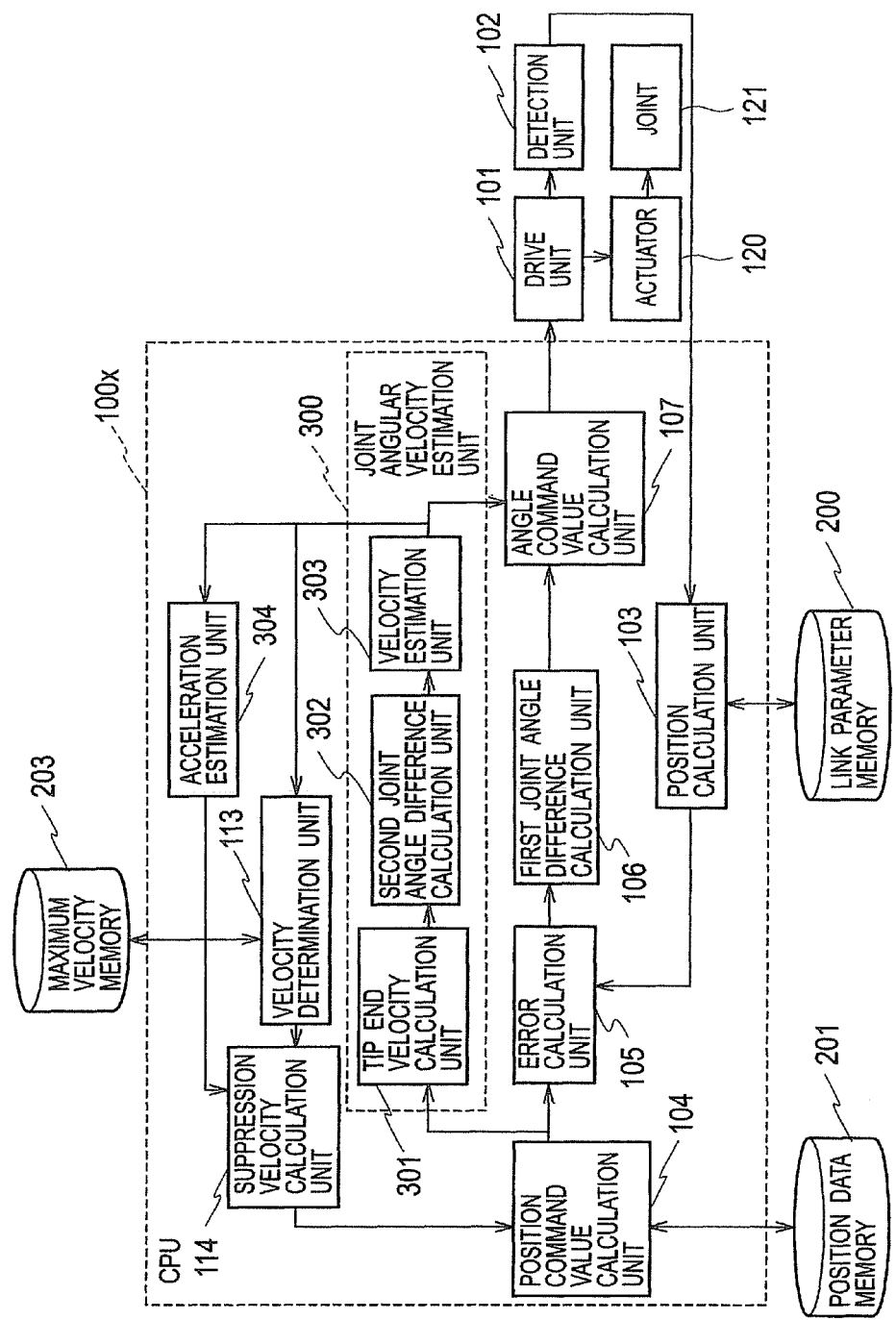
FIG. 7 is a block diagram showing an example of a robot control apparatus according to a second embodiment of the present invention.
Figure 8:
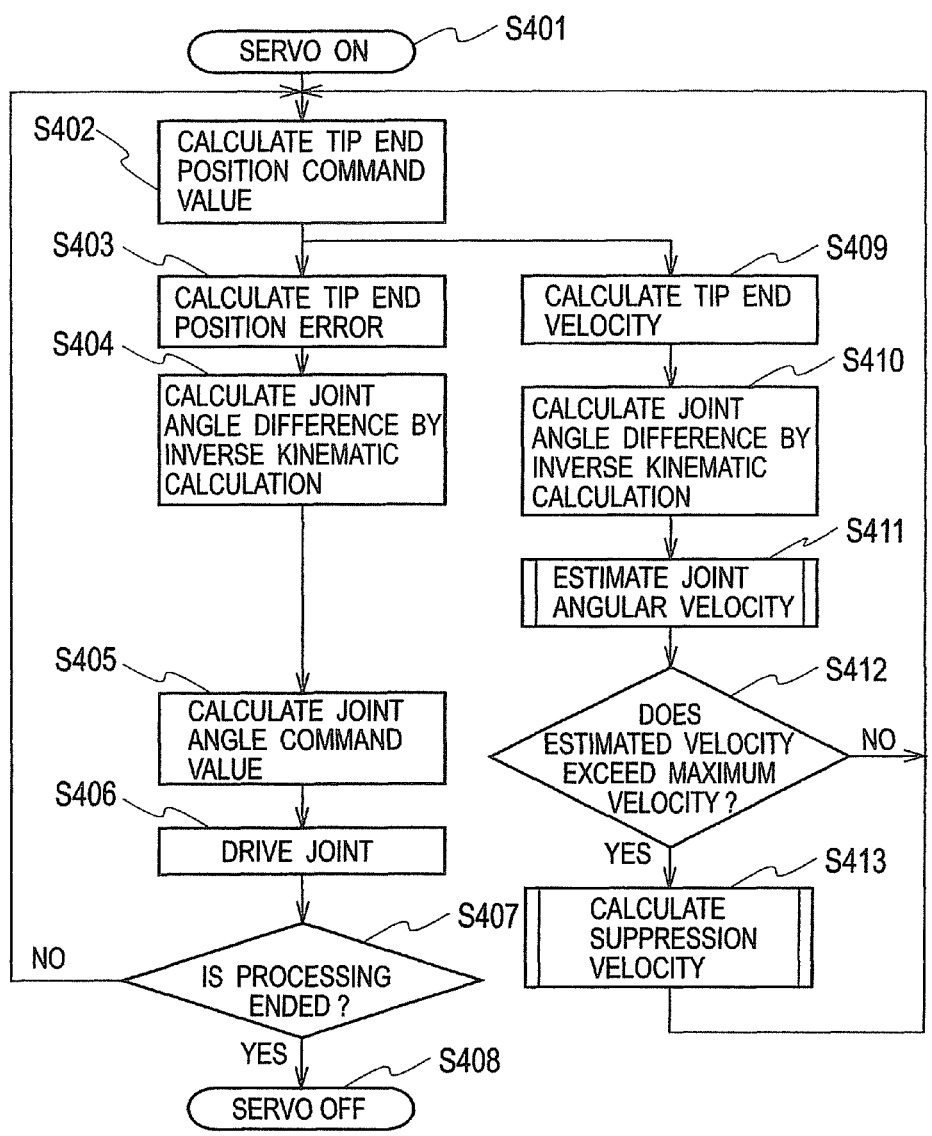
FIG. 8 is a flowchart for explaining an example of a robot control method according to the second embodiment.

As shown in FIG. 7, a robot control apparatus according to the second embodiment of the present invention includes a central processing unit (CPU) 100x, the drive unit 101, the detection unit 102, the actuator 120, the link parameter memory 200, the position data memory 201, the acceleration memory 202 and the maximum velocity memory 203.

The CPU 100x logically includes the position calculation unit 103, the position command value calculation unit 104, the error calculation unit 105, a first joint angle difference calculation unit 106, the angle command value calculation unit 107, a joint angular velocity estimation unit 300, an acceleration estimation unit 304, the velocity determination unit 113 and the suppression velocity calculation unit 114 as modules (logic circuits) which are hardware resources.

The joint angular velocity estimation unit 300 includes a tip end velocity calculation unit 301, a second joint angle difference calculation unit 302 and a velocity estimation unit 303.

The tip end velocity calculation unit 301 proactively performs the calculation of the position command value calculation unit 104, takes a difference between tip end position command values in two thither and latter still unexecuted control cycles based on the tip end position command values in the plurality of still unexecuted control cycles, which are calculated by the position command value calculation unit 104, and individually calculates the tip end velocities in the plurality of still unexecuted control cycles.

The second joint angle difference calculation unit 302 individually calculates the joint angle differences in the plurality of still unexecuted control cycles from the tip end velocities in the plurality of still unexecuted control cycles, which are calculated by the tip end velocity calculation unit 301, by the inverse kinematic calculation.

The velocity estimation unit 303 estimates the joint angular velocities in the plurality of still unexecuted control cycles from the joint angle differences in the plurality of still unexecuted control cycles, which are calculated by the second joint angle difference calculation unit 302, for example, by using the interpolation formula like Expression (3) derived from the least-square method. The tip end position command values create a smooth trajectory including accelerations and deaccelerations in advance, and accordingly, the joint angular velocities thus estimated form an ideal velocity waveform, and can be estimated accurately.

The acceleration estimation unit 304 takes the time difference between the joint angular velocities in the plurality of still unexecuted control cycles, which are estimated by the velocity estimation unit 303, and individually estimate the joint angular accelerations in the plurality of still unexecuted control cycles.

The angle command value calculation unit 107 multiplies the joint angular velocities, which are estimated by the velocity estimation unit 303, by a gain prepared as a feedforward element, and then adds products thus obtained to the joint angle differences in the plurality of still unexecuted control cycles, which are calculated by the first joint angle difference calculation unit 106, and thereby individually calculate the joint angle command values in the plurality of still unexecuted control cycles. As a result, control responsiveness can be further improved.

Since other configurations of the robot control apparatus according to the second embodiment of the present invention shown in FIG. 7 are substantially the same as the configurations of the robot control apparatus according to the first embodiment of the present invention shown in FIG. 1, a redundant description thereof will be omitted. Next, a description will be made of an example of a robot control method according to the second embodiment of the present invention while referring to a flowchart of FIG. 8.

In step S401, control calculation is started. In step S402, the position command value calculation unit 104 calculates the tip end position command values in the plurality of still unexecuted control cycles from the target tip end position data string stored in the position data memory 201. In step S403, the detection unit 102 detects the joint angles in the plurality of already executed control cycles. The error calculation unit 105 calculates errors between the tip end positions calculated by the position calculation unit 103 and the tip end position command values calculated by the position command value calculation unit 104. In step S404, the joint angle difference calculation unit 106 calculates the joint angle differences by the inverse kinematic calculation using Expression (2). In step S405, the joint angle command values are calculated from the joint angle differences, and in step S406, the joint is driven by defining the joint angle command values as the control target values. In step S407, it is determined whether or not the control calculation is ended. If the control calculation is determined to be ended, then the processing is completed in step S408, and if the control calculation is determined not to be ended, then the processing returns to step S402, and the tip end position command values are calculated again.

In step S409, for the plurality of still unexecuted control cycles, in which the tip end position command values are calculated by the position command value calculation unit 104, the tip end velocity calculation unit 116 takes the differences from the tip end position command values in before and after the control cycles concerned, and calculates the tip end velocities in the plurality of still unexecuted control cycles. In step S410, by the inverse kinematic calculation, the second joint angle difference calculation unit 302 calculates the joint angle differences in the plurality of still unexecuted control cycles from the tip end velocities in the plurality of still unexecuted control cycles, which are calculated by the tip end velocity calculation unit 116. In step S411, by using the interpolation formula like expression (3), the velocity estimation unit 303 estimates the joint angular velocities in the plurality of still unexecuted control cycles from the joint angle differences in the plurality of still unexecuted control cycles, which are calculated by the second joint angle difference calculation unit 302.

In step S412, the velocity determination unit 113 determines whether or not the joint angular velocities in the plurality of still unexecuted control cycles, which are estimated by the velocity estimation unit 303, exceed the maximum velocity stored in the maximum velocity memory 203. In the case where it is determined that the joint angular velocities in the plurality of still unexecuted control cycles exceed the maximum velocity, then in step S413, the suppression velocity calculation unit 114 calculates the suppression joint angular velocities from the joint angular velocities in the plurality of still unexecuted control cycles, which are estimated by the velocity estimation unit 303, and from the joint angular accelerations in the plurality of still unexecuted control cycles, which are estimated by the acceleration estimation unit 304, in a similar way to the procedures in the first embodiment of the present invention. Thereafter, the processing returns to step S402, and the position command value calculation unit 104 calculates the tip end position command values in the plurality of still unexecuted control cycles based on the target tip end position data string stored in the position data memory 201 and on the suppression joint angular velocities. Meanwhile, in the case where it is determined in step S412 that the joint angular velocities in the plurality of still unexecuted control cycles do not exceed the maximum velocity, then the processing returns to step S402, and the position command value calculation unit 104 sequentially calculates the tip end position command values in the plurality of sill unexecuted control cycles in the estimated range from the target tip end position data string stored in the position data memory 201.

In accordance with the second embodiment of the present invention, the calculation of the position command value calculation unit 104 is proactively performed, the joint angular velocities in the plurality of still unexecuted control cycles are estimated, and the suppression joint angular velocities are calculated, whereby the robot can be operated stably even during an operation that the robot passes through the area like the vicinity of the singular point, where the joint angular velocity changes suddenly.

Other Embodiment

Various modifications will become possible for those skilled in the art after receiving the teachings of the present disclosure without departing from the scope thereof.

For example, in the first embodiment of the present invention, the CPU 100, the drive unit 101, the link parameter memory 200, the position data memory 201, the acceleration memory 202, the maximum velocity memory 203 and the like may be embedded into an inside of the robot and may be integrated therewith. Moreover, it is also possible to arrange the CPU 100, the drive unit 101, the link parameter memory 200, the position data memory 201, the acceleration memory 202, the maximum velocity memory 203 and the like on an outside of the robot, and to remotely control the robot from the outside by wire or wirelessly.

Moreover, Expression (3) that is the quadratic polynomial is used as the interpolation formula in the first embodiment of the present invention; however, the interpolation formula is not limited to the quadratic formula like Expression (3). An n-order (n is a positive integer) polynomial may be used as the interpolation formula.

Furthermore, in the first embodiment of the present invention, the description has been made of the case of estimating the joint angular velocities in the four still unexecuted control cycles $t_1$, $t_2$, $t_3$ and $t_4$ from the three already executed control cycles $t_{-1}$, $t_{-2}$ and $t_{-3}$; however, the number of steps of the already executed control cycles, which are used for estimating the joint angular velocities, and the number of steps of the still unexecuted control cycles, for which the joint angular velocities are estimated, are appropriately settable, and no particular limitations are imposed thereon.

INDUSTRIAL APPLICABILITY

The present invention can be used for a robot control apparatus and a robot control method.

REFERENCE SIGNS LIST

100 Central processing unit
101 Drive unit
102 Detection unit
103 Position calculation unit
104 Position command value calculation unit
105 Error calculation unit
106, 302 Joint angle difference calculation unit
107 Angle command value calculation unit
108 Velocity calculation unit
109, 110 Acceleration calculation unit
111, 304 Acceleration estimation unit
112, 303 Velocity estimation unit
113 Velocity determination unit
114 Suppression velocity calculation unit
115, 300 Joint angular velocity estimation unit
116 Tip end velocity calculation unit
120 Actuator
121 Joint 121
200 Link parameter memory
201 Position data memory
202 Acceleration memory
203 Maximum velocity memory
301 Tip end velocity calculation unit

The invention claimed is:

1. A robot control apparatus controlling a robot having a joint, comprising:
an actuator configured to drive the joint for each control cycle;
a detection unit configured to detect a joint angle of the joint for the each control cycle;
a position calculation unit configured to calculate a tip end position of the robot from the joint angle for the each control cycle;
a first value calculation unit configured to calculate a position command value for controlling the tip end position for the each control cycle;
an error calculation unit configured to calculate an error between the tip end position and the position command value for the each control cycle;
a difference calculation unit configured to calculate a joint angle difference from the error by inverse kinematic calculation for the each control cycle;
an second value calculation unit configured to calculate a joint angle command value by integrating the joint angle difference for the each control cycle;
a drive unit configured to drive the actuator based on the joint angle command value for the each control cycle;
a first velocity estimation unit configured to calculate a plurality of first joint angular accelerations in already executed control cycles by calculating the joint angular acceleration from the joint angle for the each control cycle, and configured to estimate a joint angular velocity in a still unexecuted control cycle from the first joint angular accelerations;
a maximum velocity memory configured to store a maximum velocity for the estimated joint angular velocity;
a velocity determination unit configured to determine whether the estimated joint angular velocity exceeds the maximum velocity; and
a suppression velocity calculation unit configured to calculate a suppression joint angular velocity in the still unexecuted control cycle from the estimated joint angular velocity when the estimated joint angular velocity is determined to exceed the maximum velocity, wherein the first velocity estimation unit comprises:
a velocity calculation unit configured to calculate the joint angular velocity from the joint angle for the each control cycle;
a first acceleration calculation unit configured to calculate the first joint angular accelerations by calculating the joint angular acceleration from the calculated joint angular velocity for the each control cycle;

a second acceleration calculation unit configured to calculate a second joint angular acceleration in a current control cycle from the joint angle difference;

an acceleration estimation unit configured to estimate a third joint angular acceleration in the still unexecuted control cycle from the first and second joint angular accelerations; and a second velocity estimation unit configured to estimate the joint angular velocity in the still unexecuted control cycle from the third joint angular acceleration.

2. The apparatus of claim 1, wherein the suppression velocity calculation unit sets the first joint angular acceleration in the still unexecuted control cycle, which is determined to exceed the maximum velocity, to be 0 or to invert sign against the still unexecuted control cycle before the still unexecuted control cycle which is determined to exceed the maximum velocity;

the suppression velocity calculation unit sets the second joint angular acceleration in the still unexecuted control cycle before the still unexecuted control cycle, which is determined to exceed the maximum velocity, based on the first joint angular acceleration; and the suppression velocity calculation unit calculates first and second suppression joint angular velocities by integrating the first and second joint angular accelerations respectively.

3. A robot control apparatus controlling a robot having a joint comprising:

an actuator configured to drive the joint for each control cycle;

a detection unit configured to detect a joint angle of the joint for the each control cycle;

a position calculation unit configured to calculate a tip end position of the robot from the joint angle for the each control cycle;

a first value calculation unit configured to calculate a position command value for controlling the tip end position for the each control cycle;

an error calculation unit configured to calculate an error between the tip end position and the position command value for the each control cycle;

a first difference calculation unit configured to calculate a first joint angle difference from the error by inverse kinematic calculation for the each control cycle;

an second value calculation unit configured to calculate a joint angle command value by integrating the first joint angle difference for the each control cycle;

a drive unit configured to drive the actuator based on the joint angle command value for the each control cycle;

a first velocity estimation unit configured to calculate a second joint angle difference in a still unexecuted control cycle by calculating the joint angle difference from the position command value sequentially, and configured to estimate a joint angular velocity in a still unexecuted control cycle from the second joint angle difference;

a maximum velocity memory configured to store a maximum velocity for the estimated joint angular velocity;

a velocity determination unit configured to determine whether the estimated joint angular velocity exceeds the maximum velocity; and a suppression velocity calculation unit configured to calculate a suppression joint angular velocity in the still unexecuted control cycle from the estimated joint angular velocity when the estimated joint angular velocity is determined to exceed the maximum velocity.

4. The apparatus of claim 3, wherein the first velocity estimation unit comprises:

a tip end velocity calculation unit configured to calculate a tip end velocity in the still unexecuted control cycle from the position command value;

a second joint angle difference calculation unit configured to calculate the second joint angle difference from the tip end velocity; and a second velocity estimation unit configured to estimate the joint angular velocity in the still unexecuted control cycle from the second joint angle difference.

* * * * *